(12) United States Patent
Dalcher

(10) Patent No.: US 8,914,887 B2
(45) Date of Patent: *Dec. 16, 2014

(54) SYSTEM, METHOD, AND COMPUTER PROGRAM PRODUCT FOR MOUNTING AN IMAGE OF A COMPUTER SYSTEM IN A PRE-BOOT ENVIRONMENT FOR VALIDATING THE COMPUTER SYSTEM

(71) Applicant: McAfee, Inc., Santa Clara, CA (US)

(72) Inventor: Gregory W. Dalcher, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/020,467

(22) Filed: Sep. 6, 2013

(65) Prior Publication Data

US 2014/0173728 A1 Jun. 19, 2014

Related U.S. Application Data

(63) Continuation of application No. 12/415,641, filed on Mar. 31, 2009, now Pat. No. 8,533,830.

(51) Int. Cl.
*G06F 21/00* (2013.01)
*G06F 21/57* (2013.01)
*G06F 21/56* (2013.01)

(52) U.S. Cl.
CPC ............ *G06F 21/575* (2013.01); *G06F 21/564* (2013.01)
USPC .................................. 726/23; 726/24; 726/25

(58) Field of Classification Search
USPC ...................................................... 726/23–25
See application file for complete search history.

(56) References Cited

U.S. PATENT DOCUMENTS

| 8,352,939 | B1 | 1/2013 | Edwards et al. |
| 2004/0225952 | A1 | 11/2004 | Brown et al. |
| 2007/0282951 | A1 | 12/2007 | Selimis et al. |
| 2009/0007105 | A1 | 1/2009 | Fries et al. |
| 2009/0254572 | A1 | 10/2009 | Redlich et al. |
| 2009/0327741 | A1 | 12/2009 | Zimmer et al. |
| 2009/0328195 | A1 | 12/2009 | Smith |

OTHER PUBLICATIONS

U.S. Appl. No. 12/202,952, filed Sep. 2, 2008.

*Primary Examiner* — Ghazal Shehni
(74) *Attorney, Agent, or Firm* — Wong Cabello Lutsch Rutherford & Brucculeri LLP

(57) ABSTRACT

A system, method, and computer program product are provided for mounting an image of a computer system in a pre-boot environment for validating the computer system. In use, an image of a computer system is mounted in a pre-boot environment of the computer system, where the image includes a file system structure and initialization data of the computer system. Furthermore, at least one task is performed on the mounted image for validating the computer system.

20 Claims, 6 Drawing Sheets

SYSTEM, METHOD, AND COMPUTER PROGRAM PRODUCT FOR MOUNTING AN IMAGE OF A COMPUTER SYSTEM IN A PRE-BOOT ENVIRONMENT FOR VALIDATING THE COMPUTER SYSTEM

The present invention relates to validating computer systems, and more particularly to validating computer systems utilizing an image of the computer system.

BACKGROUND

Traditionally, computer systems have been monitored for detecting unwanted activity. Unfortunately, the time during which monitoring is capable of being employed with respect to computer systems has generally been limited. Such limitations have often been associated with an ability to monitor computer systems during boot up.

For example, it may be difficult to load the software components needed to perform the monitoring early in the system boot process, leading to gaps in monitoring capabilities. Thus, by the time the monitoring components are loaded malware may have already compromised the computer system and may accordingly be able to prevent the load and execution of the monitoring components or obstruct their view of the system. This lack of early systems monitoring leaves open a key window of opportunity for attack.

There is thus a need for addressing these and/or other issues associated with the prior art.

SUMMARY

A system, method, and computer program product are provided for mounting an image of a computer system in a pre-boot environment for validating the computer system. In use, an image of a computer system is mounted in a pre-boot environment of the computer system, where the image includes a file system structure and initialization data of the computer system. Furthermore, at least one task is performed on the mounted image for validating the computer system.

DETAILED DESCRIPTION

Figure 1:
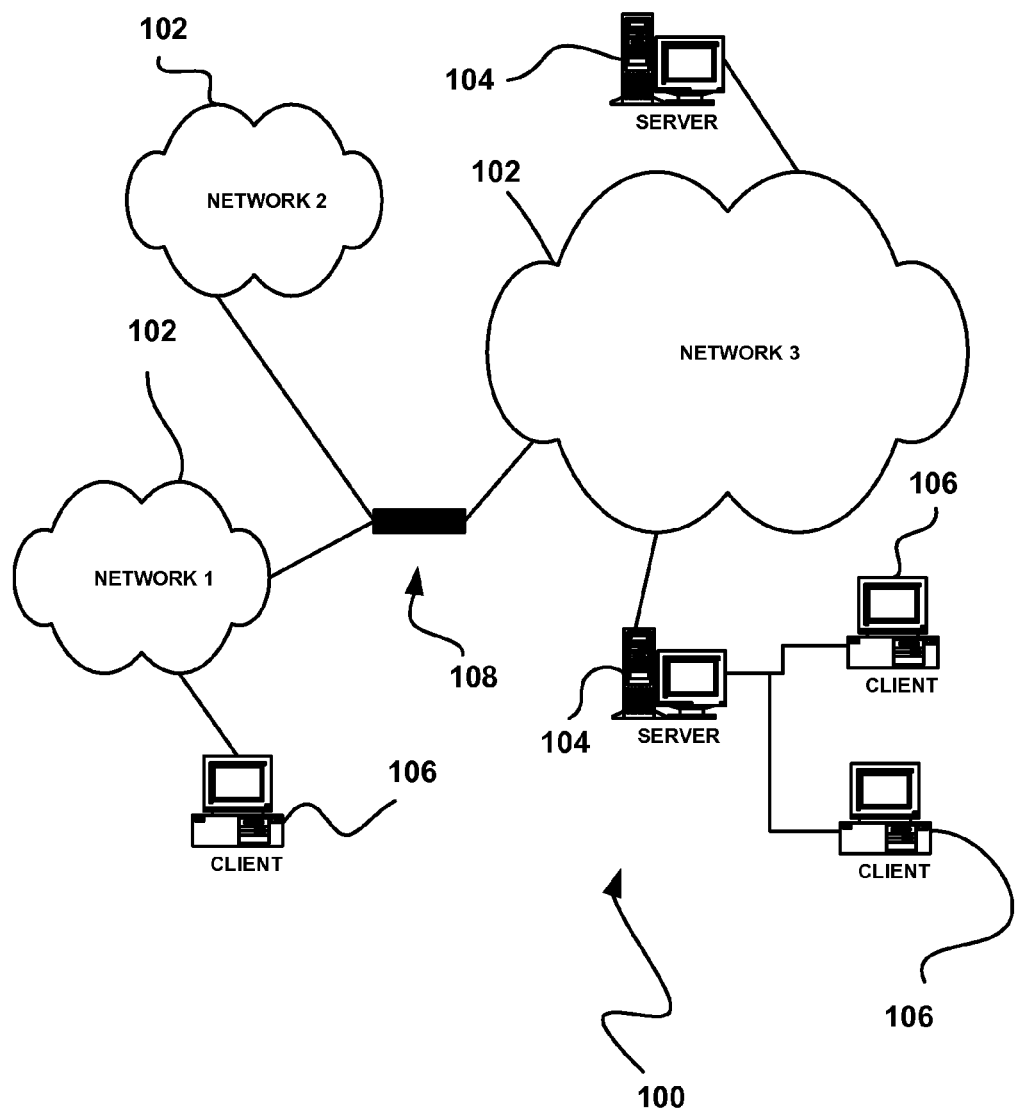
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
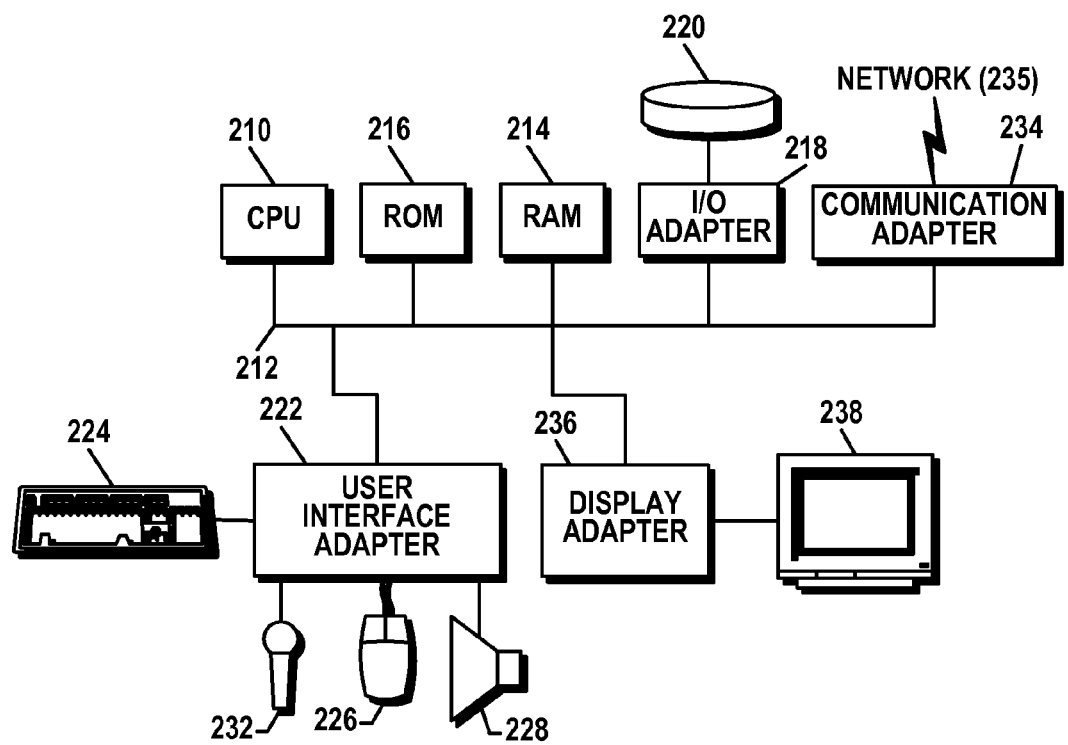
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
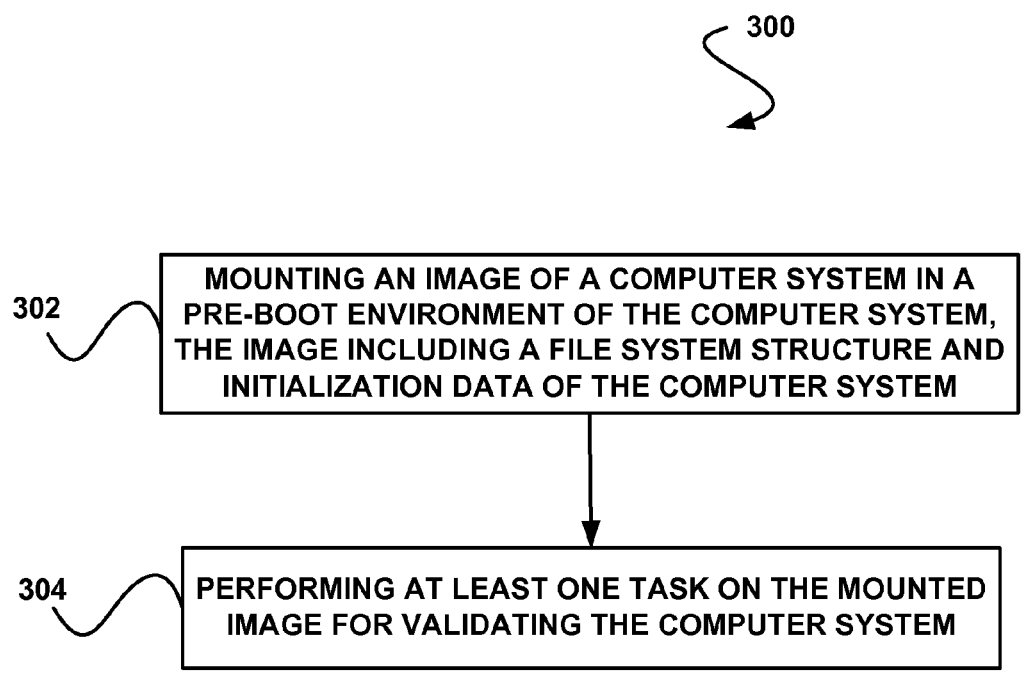
FIG. 3 shows a method for mounting an image of a computer system in a pre-boot environment for validating the computer system, in accordance with one embodiment.

FIG. 3 shows a method 300 for mounting an image of a computer system in a pre-boot environment for validating the computer system, in accordance with one embodiment. As an option, the method 300 may be carried out in the context of the architecture and environment of FIGS. 1 and/or 2. Of course, however, the method 300 may be carried out in any desired environment.

As shown in operation 302, an image of a computer system is mounted in a pre-boot environment of the computer system, where the image includes a file system structure and initialization data of the computer system. With respect to the present description, the computer system may include any device capable of storing the file system structure and the initialization data. For example, the computer system may include any of the devices described above with respect to FIGS. 1 and/or 2.

To this end, the file system structure of the computer system may include any set of files stored on the computer system. For example, the file system structure may include a directory of the computer system. In addition, the initialization data of the computer system may include any data (e.g. schemes, files, etc.) utilized for initializing the computer system. Just by way of example, the initialization data may include a registry of the computer system.

As noted above, the image of the computer system includes the file system structure and the initialization data of the computer system. Thus, the file system structure and the initialization data may be accessible via the image. In one embodiment, the image may be of a drive of the computer system which stores the file system structure and the initialization data of the computer system, such as the C drive, the D drive, etc. Of course, the image of the computer system may also include any other data located on the computer system.

It should be noted that the image of the computer system may be mounted (and optionally parsed) in any manner that makes the file system structure and the initialization data of the computer system (and any other data stored therein) accessible. Optionally, the image of the computer system may be mounted for providing an accessible view of the file system structure and the initialization data (e.g. for presenting the file system structure and the initialization data as an accessible disk drive). In various embodiments, the image of the computer system may be mounted in a manner that allows read access to the file system structure and the initialization data, write access to the file system structure and the initialization data, etc. For example, the image of the computer system may be mounted for allowing tasks to be performed on the image of the computer system, as set forth below in more detail with respect to operation 304.

Additionally, the pre-boot environment of the computer system in which the image of the computer system is mounted may include any environment of the computer system that exists during a pre-boot of the computer system during which the image of the computer system may be mounted. In one embodiment, the pre-boot environment may include an environment existing in the computer system prior to loading, execution, initiation, running, etc. of the file system structure and the initialization data of the computer system (and any other data stored therein). For example, the pre-boot environment may include an environment existing in the computer system prior to execution of an operating system of the computer system (e.g. where the operating system provides the file system structure and the initialization data of the computer system). Accordingly, the pre-boot environment may optionally exist outside of the operating system associated with the image and before such operating system runs.

In this way, the image of the computer system may be mounted in an environment of the computer system that exists during a pre-boot of the computer system. Just by way of example, the image of the computer system may be mounted before execution of the operating system of the computer system, and thus may be mounted outside of such operating system. As another example, the image of the computer system may be mounted before any loading, executing, etc. of the file system structure and the initialization data.

In one embodiment, the pre-boot environment may be provided via virtualization. With respect to such virtualization, the image of the computer system may be a virtual image which is mounted within an environment separate from the environment in which the file system structure and the initialization data are associated. For example, the image of the computer system may be mounted within a dedicated virtualization guest (e.g. an instance of a virtual machine which to all components running within it appears to be a physical machine separate from the computer system, and which includes operating system and application components), a virtualization host (e.g. a host of a virtualization guest), or with respect to embedded hypervisors, such as native or bare metal hypervisors, the hypervisor. Through this mounting, the dedicated virtualization guest may not necessarily be running, affording a pre-boot view of the dedicated virtualization guest if the image was taken while the dedicated virtualization guest was shutdown. One example of mounting an image utilizing virtualization is described in U.S. patent application Ser. No. 11/949,609, filed Dec. 3, 2007 and entitled "System, Method and Computer Program Product For Performing A Security Or Maintenance Operation In Association With Virtual Disk Data," which is hereby incorporated by reference.

In another embodiment, the pre-boot environment may be provided via a disk-based bootstrap. The disk-based bootstrap may include an environment capable of being utilized to launch operating system (e.g. Windows® operating system) images. The disk-based bootstrap environment may run when a disk of the computer system storing the file system structure and the initialization data is booted from, providing a pre-boot environment for the operating system of the computer system that may later be launched by bootstrap code.

In yet another embodiment, the pre-boot environment may be provided via a chipset extension. The chipset extension may allow mounting of the image of the computer system outside of full operation of the computer system. Just by way of example, the chipset extension may include the Intel® active management technology (AMT) environment capable of executing independently of a full-system launch, such as through a disk-based bootstrap process. Of course, while various examples of mechanisms capable of being utilized to provide the pre-boot environment have been described above, it should be noted that the pre-boot environment may be provided in any desired manner.

Furthermore, as shown in operation 304, at least one task is performed on the mounted image for validating the computer system. With respect to the present description, validating the computer system may include any validation of the file system structure and the initialization data of the computer system. Just by way of example, the computer system may be validating by verifying that the file system structure and the initialization data of the computer system does not include unwanted data (e.g. malware, etc.).

In one embodiment, the task performed on the mounted image may include scanning the mounted image for unwanted data. The scanning may include a signature-based scan, for example. One example of scanning the mounted image is described in detail with respect to U.S. patent application Ser. No. 11/949,609, filed Dec. 3, 2007 referenced above.

Further, the task may include reporting a detection of unwanted data resulting from the scan, and optionally remediating the unwanted data if a policy, instructions, etc. for such remediation is available. As yet another option, the task may include aborting a load of the computer system (e.g. aborting the boot-up of the computer system) in response to a determination that the remediation of the unwanted data is not to be performed (e.g. a policy, instructions, etc. for such remediation is not available).

In another embodiment, the task performed on the mounted image may include identifying a first set of components (e.g. files, data, applications, drivers, etc.) registered to be automatically loaded (hereinafter referred to as auto-start components). The auto-start components may include processes that are registered to start automatically during operating system startup or when a new user logs into the operating system of the computer system. For example, the auto-start components may include user mode processes, such as Windows® services that are configured to start automatically during operating system startup. As another example, the auto-start components may include non-services applications that are registered to launch automatically during operating system startup.

In yet another embodiment, the task performed on the mounted image may include identifying a second set of components registered to be loaded during a boot-up stage of the computer system that is predetermined to be early (hereinafter referred to as early load components). The boot-up stage of the computer system that is predetermined to be early may include a predetermined time period within an initial portion of a lifecycle of the operating system of the computer system, with respect to the present embodiment. As an option, the early load components may include drivers, such as kernel mode drivers. In various embodiments, the load order of the early load components may be scheduled to begin at certain points within the operating system bootstrap process or to be done on-demand at the request of user mode processes, which may be later in the operating system bootstrap process than the scheduled early load components.

In one embodiment, the auto-start components and/or the early load components may be identified utilizing the initialization data, for example, where the initialization data indicates which components of the computer system are auto-start components and/or the early load components. Of course, however, the auto-start components and/or the early load components may be identified in any desired manner.

In still yet another embodiment, the task performed on the mounted image may include registering at least a portion of a set of components (e.g. signatures, scanners, etc.) utilized for security monitoring of the computer system. Optionally, the security monitoring components may be registered as early load components (e.g. by modifying the initialization data, etc.). As another option, the security monitoring components may have limited functionality as a result of only a portion of the security monitoring components being loaded by the computer system.

In still yet another embodiment, the task performed on the mounted image may include determining, for each component in the first set of components and the second set of components, whether the component is trusted. With respect to the present description, determining whether a component is trusted may include determining whether the component is known to be wanted (e.g. known to not include malware, known to be provided by a source predetermined to not be associated with malware, predetermined to be legitimate, predetermined based on a policy to be a component that is wanted to be run, etc.). Thus, for example, a component may be determined to be trusted if the component is known to be wanted, whereas a component may be determined to be untrusted if the component is not necessarily known to be wanted (e.g. is known to be unwanted, is potentially unwanted, etc.).

As an option, determining whether each component in the first set of components and the second set of components is trusted may be based on a scanning of the component against known unwanted components. The known unwanted components may include component predetermined to be unwanted. For example, if the component matches a known unwanted component, the component may be determined to be untrusted. As another example, if the component does not match a known unwanted component, the component may be determined to be trusted. The component may optionally only be determined to be trusted if the scanning is performed utilizing up-to-date signatures of known unwanted components.

As another option, determining whether each component in the first set of components and the second set of components is trusted may be based on verification of a digital signature associated with the component. For example, it may be validated that the component is digitally signed by a source predetermined to be trusted. In one embodiment, a binary (e.g. executable) of the component may be cryptographically compared to signatures predetermined to be utilized by trusted sources, such that if a match is identified, the component may be determined to be trusted. Of course, if a match is not identified, the component may be determined to be untrusted.

In another embodiment, the task performed on the mounted image may include reacting if it is determined that the component is untrusted. Thus, if the component is determined to be trusted, no action may optionally be performed with respect to such component (e.g. and thus the component may be allowed to load, execute, etc. with any modification). The reaction may include rescheduling an initiation of the component in response to a determination that the component is capable of being rescheduled, as an option. For example, the component may be rescheduled to be initiated after loading a security system on the computer system, after loading of predetermined components (e.g. core monitoring components, the registered monitoring components described above, etc.) of the security system, etc. As another example, the component may be rescheduled to be initiated on-demand by the security system of the computer system.

As another option, the reaction may include substituting the component with another component in response to a determination that the component is capable of being substituted. For example, if the component is determined to be a critical component (e.g. a component that cannot be rescheduled and that is necessary to any wanted functionality of the computer system, such as the security system of the computer system), it may be determined whether the component is capable of being substituted with another component. As still yet another option, the reaction may include flagging the component for manual analysis by an administrator (e.g. in response to a determination that the component is not capable of being rescheduled or substituted), aborting a load of the component, allowing operating of the computer system in a limited operating mode (e.g. a safe operating mode), etc.

While various examples of tasks have been described above, it should be noted that any task capable of validating the computer system may be performed on the mounted image. Optionally, the task may be performed in the pre-boot environment of the computer system. For example, the task may be performed outside of an operating system of the computer system.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4A:
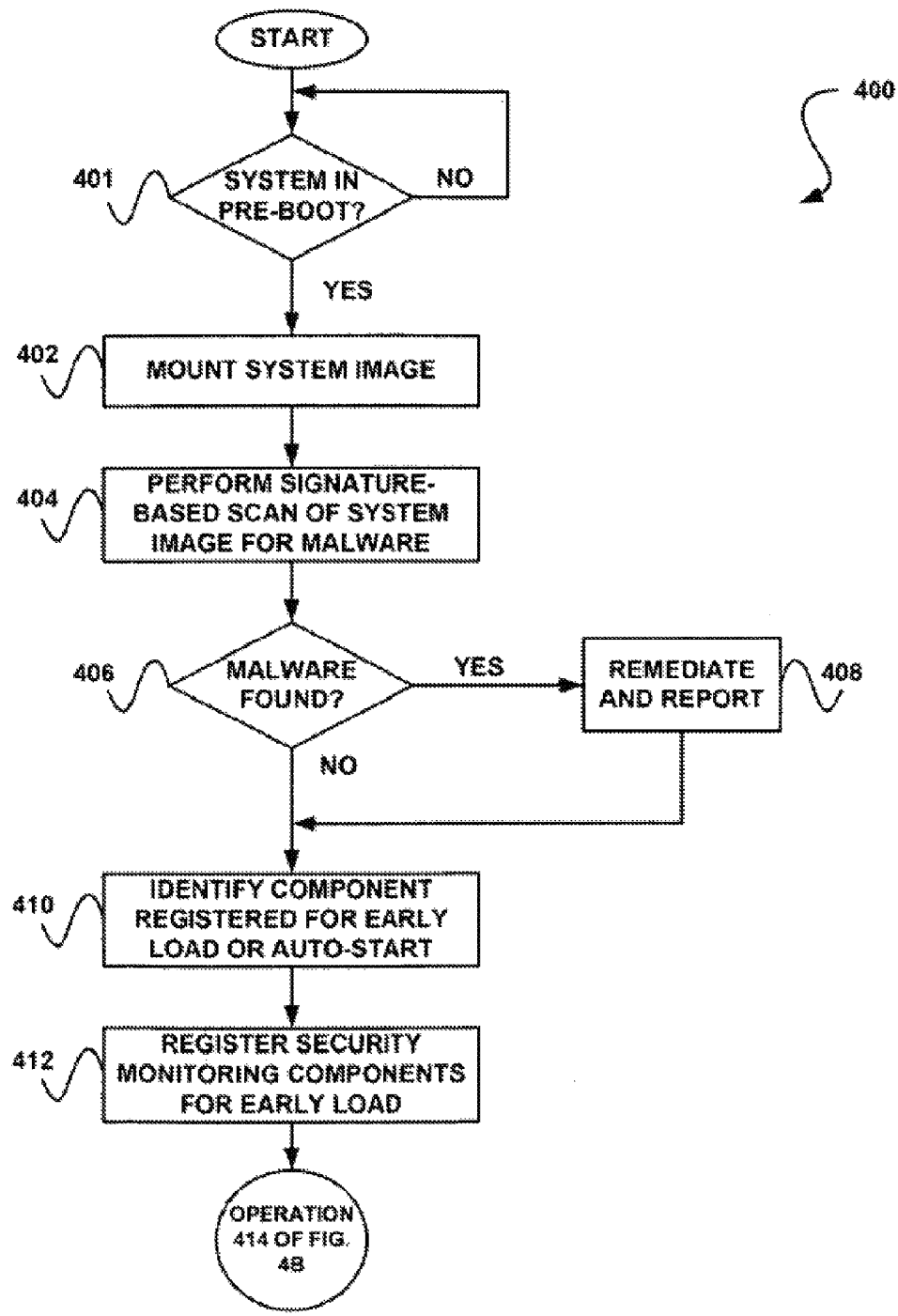
FIGS. 4A-B shows a method for identifying early load and auto-start software and reacting to a determination that the same are untrusted, in accordance with another embodiment.
Figure 4B:
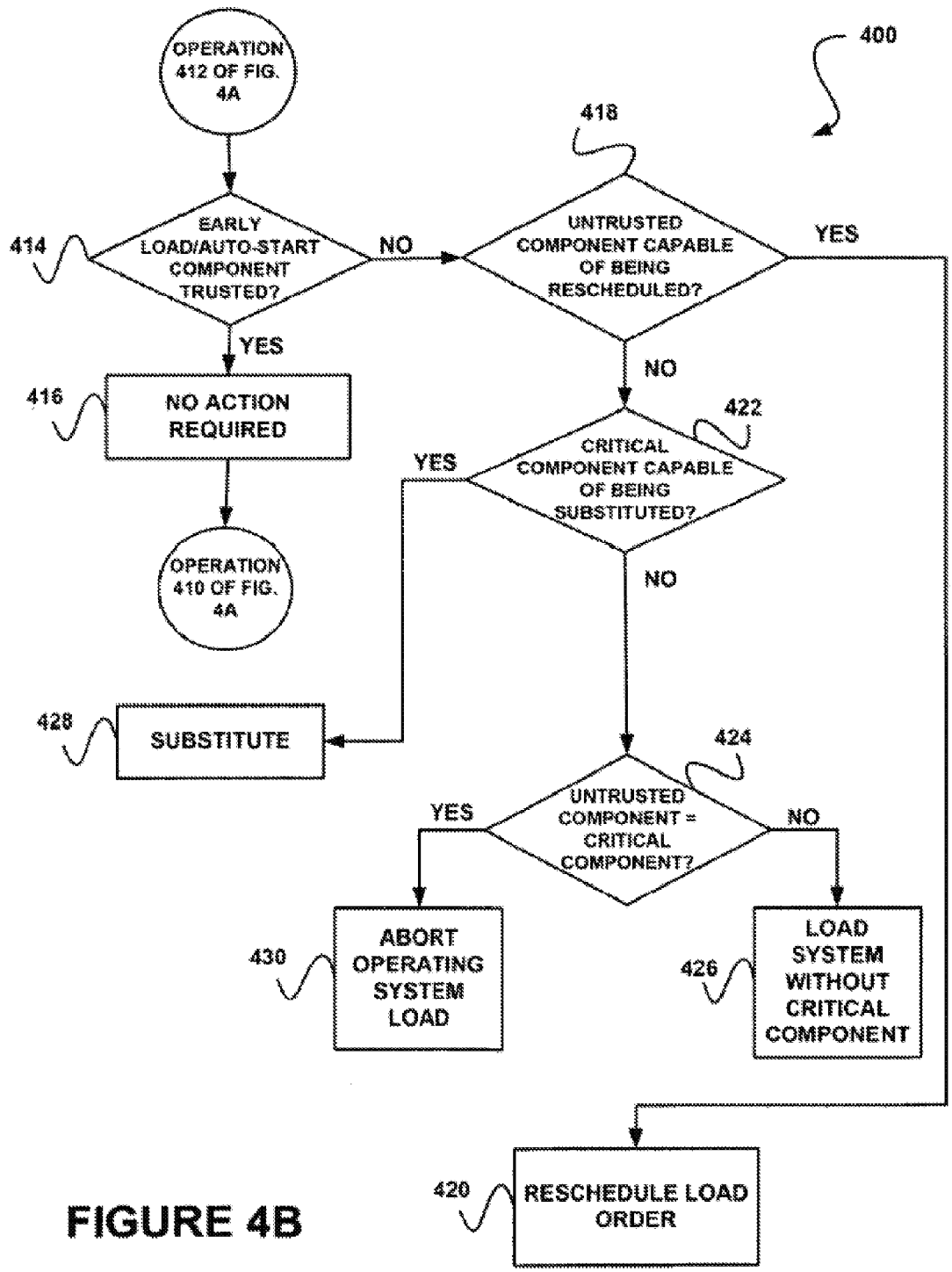

FIGS. 4A-B shows a method 400 for identifying early load and auto-start software and reacting to a determination that the same are untrusted, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in decision 401, it is determined whether a computer system is in a pre-boot. With respect to the present embodiment, the computer system may be determined to be in pre-boot if an operating system of the computer system has not yet loaded and if a system image of the computer system is capable of being mounted during the pre-boot. For example, determining whether the computer system is in a pre-boot may include determining whether a pre-boot environment of the computer system exists.

If it is determined that the computer system is in a pre-boot, a system image is mounted. Note operation 402. Such system image may include any image of a file system structure and initialization data of the computer system that is capable of being mounted, with respect to the present embodiment. Additionally, a signature-based scan is performed on the system image, as shown in operation 404. With respect to the present embodiment, the signature-based scan may include scanning the system image for malware.

Further, it is determined in decision 406 whether malware is found in the system image. Such determination may be based on the signature-based scan, as noted above. If it is determined that malware is found, the malware is remediated and reported. Note operation 408. As an option, the malware may only be remediated if remediation instructions exist (e.g. for use in remediating the malware). As another option, the malware may be reported to an administrator.

If it is determined that malware is not found in the system image, or after remediation and reporting of the found malware, a component registered for early load or auto-start is identified. Note operation 410. In one embodiment, the initialization data of the system image may be utilized to identify the component registered for early load or auto-start. For example, the initialization data may indicate all components registered for early load or auto-start. In various embodiments, the early load/auto-start component may include a kernel mode driver (e.g. which may potentially be associated with a rootkit), an operating system service, an operating system daemon (e.g. privileged user mode processes), etc.

Moreover, security monitoring components are registered for early load, as shown in operation 412. As an option, the security monitoring components may include components of a security system utilized for monitoring the computer system for malware. As another option, only predetermined security monitoring components of the security system may be registered for early load, such as security monitoring components predetermined to be critical for at least a base level of monitoring of the security system (e.g. such that only partial functionality of the security system is provided).

Still yet, as shown in decision 414, it is determined whether the identified early load/auto-start component (in operation 410) is trusted. Such decision may be made by scanning the early load/auto-start component to determine if the early load/auto-start component matches a known unwanted (or a known wanted) early load/auto-start component. As another option, the decision may be made by verifying that a digital signature associated with the early load/auto-start component is a digital signature of an entity predetermined to be trusted.

As yet another option, the decision may be made based on a behavioral analysis of a history of the early load/auto-start component. For example, the analysis may be of an installation of the early load/auto-start component, an origin of the early load/auto-start component, a modification of the early load/auto-start component by another component, etc. On example of an infrastructure capable of being used to determine whether a component is trusted using a behavioral analysis of a history of the component is described in U.S. patent application Ser. No. 12/202,952, filed Sep. 2, 2008, and entitled "Behavioral Analysis System, Method, and Computer Program Product for Propagating Events Over a Plurality of Hierarchical Levels of Processing." To this end, determining whether the early load/auto-start component is trusted may include validating the load/auto-start component.

If it is determined that the early load/auto-start component is trusted, no action is required, as noted in operation 416. Thus, the early load/auto-start component may be allowed to load normally (e.g. without modification, interference, etc.) with respect to the computer system. Furthermore, as a result of the determination that the early load/auto-start component is trusted, another early load/auto-start component is identified (see operation 410).

If it is determined that the early load/auto-start component is untrusted (hereinafter referred to untrusted component), it is determined whether the untrusted component is capable of being rescheduled. Note decision 418. For example, it may be determined that the untrusted component is capable of being rescheduled if rescheduling of the untrusted component does not result in unwanted, malfunctioning, etc. operation of the computer system and if the untrusted component may be capable of operating at a different time. Optionally, it may be determined that the untrusted component is capable of being rescheduled if the untrusted component is included in a list of early load/auto-start components predetermined to be capable of being rescheduled.

If it is determined that the untrusted component is capable of being rescheduled, a load order of the computer system is rescheduled, as shown in operation 420. With respect to the present embodiment, the load order of the computer system may be rescheduled such that the untrusted component is executed at a later time. For example, the untrusted component may be rescheduled to be executed after the security monitoring components registered in operation 412 are loaded. As another example, the untrusted component may be rescheduled to be executed on-demand (e.g. by the security monitoring components).

If, however, it is determined that the untrusted component is not capable of being rescheduled, it is determined whether the untrusted component is capable of being substituted. Note decision 422. It may optionally be determined that the critical component is capable of being substituted if the critical component matches a critical component in a list of critical components predetermined to be capable of being substituted. One example of an early load/auto-start component that is incapable of being rescheduled or substituted may include a device driver that is utilized for accessing the file system structure of the system image.

If it is determined that the untrusted component is capable of being substituted, the untrusted component is substituted (see operation 428). With respect to the present embodiment, substituting the untrusted component may include replacing the untrusted component with another component. In one embodiment, the untrusted component may include an advanced component which may be replaced by a less advanced (e.g. a standard) component. For example, the untrusted component may include an advanced display driver that is replaced with a standard display driver (e.g. that has less functionality, features, etc. of the critical component).

If, however, it is determined that the untrusted component is not capable of being substituted, it is determined whether the untrusted component is a critical component (see decision 424). With respect to the present embodiment, the critical component may include any component that must necessarily be executed, loaded, etc. at a certain time (e.g. for proper operation of the computer system, the security monitoring components registered in operation 412, etc.). As an option, it may be determined that the untrusted component is a critical component if the untrusted component matches a component in a list of components predetermined to be critical.

If it is determined that the untrusted component is not a critical component, the system is loaded without the component. Note operation 426. For example, the component may be prevented from loading during boot-up, execution, etc. of the computer system. As another example, the operating system of the computer system may be loaded in a limited operational mode if it is determined that the untrusted component is not a critical component. In this way, the system may be loaded with limited functionality (e.g. without the functionality of the component).

If it is determined that the untrusted component is a critical component (hereinafter referred to critical component), the operating system load is aborted (see operation 430). For example, the operating system of the computer system may be prevented from being loaded (e.g. thus preventing a loading of the untrusted component). Optionally, an administrator may also be notified of the untrusted component and that such component resulted in the operating system load being aborted.

Figure 5:
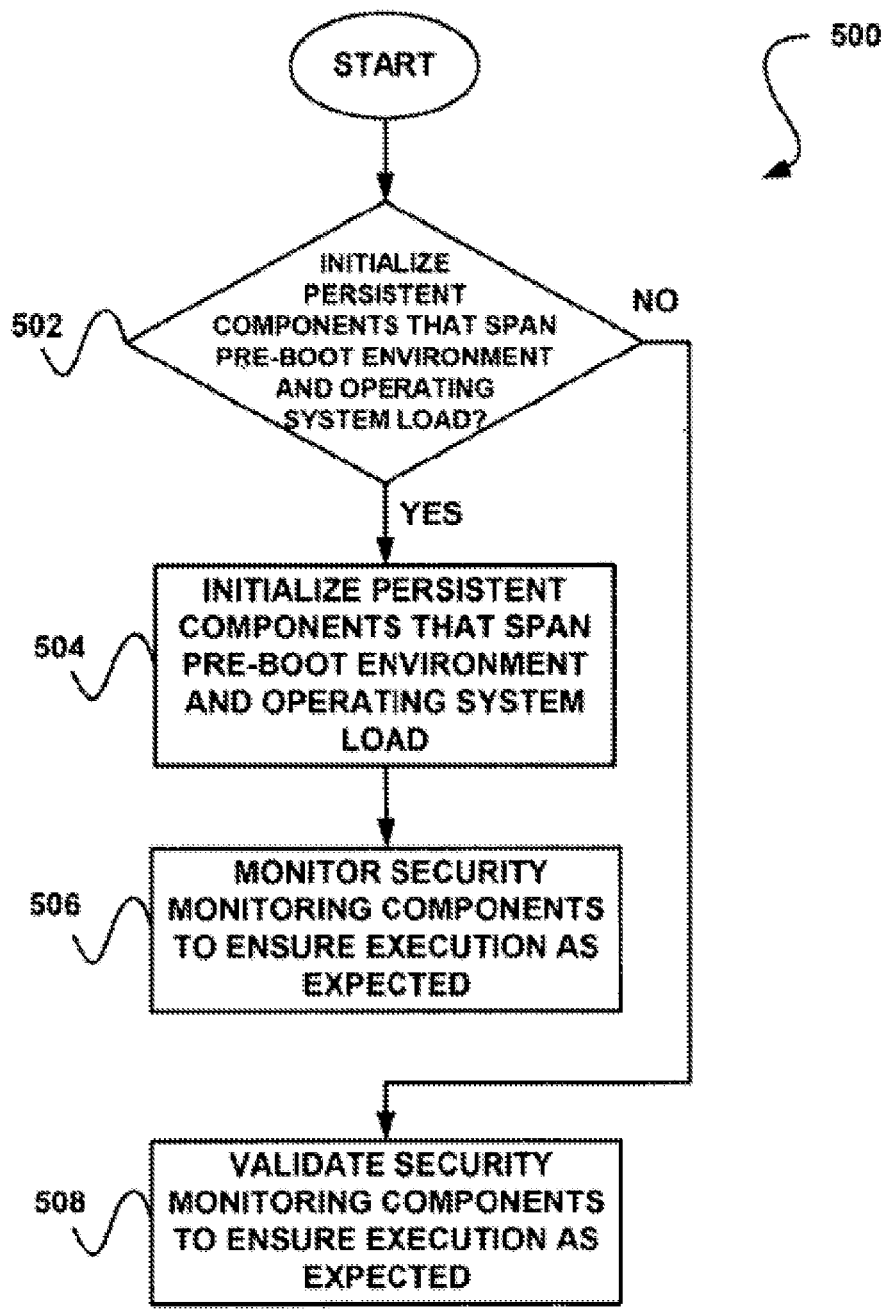
FIG. 5 shows a method for initializing persistent components to monitor a computer system, in accordance with yet another embodiment.

FIG. 5 shows a method 500 for initializing persistent components to monitor a computer system, in accordance with yet another embodiment. As an option, the method 500 may be carried out in the context of the architecture and environment of FIGS. 1-4B. For example, the method 500 may be carried out in response to performance of operation 416 of FIG. 4B. Of course, however, the method 500 may be carried out in any desired environment. Again, it should be noted that the aforementioned definitions may apply during the present description.

As shown in decision 502, it is determined whether persistent components are capable of being initialized to span a pre-boot environment and an operating system load. With respect to the present embodiment, the persistent components may include any components that persist from the pre-boot environment to the operating system load. For example, the pre-boot environment may initiate the persistent components, and such persistent components may continue to execute after an image of the operating system is bootstrapped. Thus, the persistent components may exist and run during the pre-boot environment, during execution of the operating system, and during a transition of a computer system from the pre-boot environment to the operating system load.

Also with respect to the present embodiment, the persistent components may be utilized for monitoring purposes, as described in more detail below with respect to operation 506. For example, the persistent components may include components of a monitoring security system.

As an option, determining whether the persistent components are capable of being initialized for spanning the pre-boot environment and the operating system load may include determining whether the persistent components exist on the computing system. As another option, determining whether the persistent components are capable of being initialized for spanning the pre-boot environment and the operating system load may include determining whether a pre-boot environment of the computer system supports the persistent components. Just by way of example, if the pre-boot environment is completely removed from memory after it completes its tasks and initiates the operating system bootstrap process, the persistent components may be incapable of being initialized for spanning the pre-boot environment and the operating system load.

In one embodiment, the persistent components may be incapable of being initialized for spanning the pre-boot environment and the operating system load if the pre-boot environment is provided via a disk-based bootstrap environment. In another embodiment, the persistent components may be capable of being initialized for spanning the pre-boot environment and the operating system load if the pre-boot environment is provided via virtualization.

If it is determined that the persistent components are not capable of being initialized for spanning the pre-boot environment and the operating system load, security software monitoring components are validated to ensure that such security software monitoring components execute as expected. Note operation 508. In one exemplary embodiment, the security software monitoring components may be validated via external polling. In another exemplary embodiment, the security software monitoring components may be validated via watchdogs.

If it is determined that the persistent components are capable of being initialized for spanning the pre-boot environment and the operating system load, the persistent components are initialized. Note operation 504. To this end, a persistent environment which includes the persistent components may optionally be implemented for monitoring purposes. As an option, the persistent environment may execute externally with respect to the operating system of the computer system (e.g. from the pre-boot environment). Further, the persistent components may optionally provide continual monitoring of the computer system as the computer system boots from the pre-boot environment.

Furthermore, as shown in operation 506, security monitoring components are monitored to ensure that the security monitoring components execute as expected. With respect to the present embodiment, the security monitoring components may include monitoring components of a security system which are registered in the pre-boot environment. Thus, the security monitoring components registered in the pre-boot environment may be further monitored to ensure that monitoring is performed by the security monitoring components in a tamper-free manner (e.g. without being circumvented by malware, etc.).

Just by way of example, activity of the security monitoring components may be compared with known legitimate activity to determine whether the security monitoring components are executing in accordance with the known legitimate activity. If the security monitoring components are executing in accordance with the known legitimate activity, the security monitoring components may be allowed to proceed monitoring the computer system. If, however, the security monitoring components are not executing in accordance with the known legitimate activity, an action may be performed, such aborting a boot-up of the computer system, shutting down the computer system, notifying an administrator of the illegitimate activity by the security monitoring components, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium comprising instructions stored thereon that when executed cause a programmable device to:
   mount an image of an operating system for a computer system in a pre-boot environment of the programmable device;
   identify an untrusted component of the operating system registered to be automatically loaded or loaded during a boot-up stage of the operating system that is predetermined to be early; and determine, in the pre-boot environment, whether to allow the operating system to load, based on characteristics of the untrusted component.

2. The non-transitory computer readable medium of claim 1, wherein the instruction stored thereon that when executed cause programmable device to determine, in the pre-boot environment, whether to allow the operating system to load, based on characteristics of the untrusted component comprise instructions that when executed cause the programmable device to:
reschedule a load order of the untrusted component.

3. The non-transitory computer readable medium of claim 1, wherein the instruction stored thereon that when executed cause the programmable device to determine, in the pre-boot environment, whether to allow the operating system to load, based on characteristics of the untrusted component comprise instructions that when executed cause the programmable device to:
substitute a trusted component for the untrusted component.

4. The non-transitory computer readable medium of claim 1, wherein the instruction stored thereon that when executed cause the programmable device to determine, in the pre-boot environment, whether to allow the operating system to load, based on characteristics of the untrusted component comprise instructions that when executed cause the programmable device to:
load the operating system without the untrusted component.

5. The non-transitory computer readable medium of claim 1, wherein the instruction stored thereon that when executed cause the programmable device to determine, in the pre-boot environment, whether to allow the operating system to load, based on characteristics of the untrusted component comprise instructions that when executed cause the programmable device to:
abort loading the operating system if the untrusted component is a critical non-substitutable component.

6. The non-transitory computer readable medium of claim 1, wherein the instructions stored thereon further comprise instructions that when executed cause the programmable device to:
monitor a security system of the programmable device during execution of the operating system, to ensure that the security system executes as expected.

7. The non-transitory computer readable medium of claim 1, wherein the pre-boot environment is a virtualized pre-boot environment.

8. The non-transitory computer readable medium of claim 1, wherein the pre-boot environment is provided by a chipset extension.

9. The non-transitory computer readable medium of claim 1, wherein the instruction that when executed cause the computer system to identify an untrusted component of the operating system comprise instructions that when executed cause the programmable device to:
verify a digital signature associated with components of the operating system registered to be automatically loaded or loaded during a boot-up stage of the operating system that is predetermined to be early.

10. A programmable apparatus, comprising:
one or more processors; and
a memory, coupled to the one or more processors, on which are stored instructions, comprising instructions that when executed cause at least some of the one or more processors to:
mount an image of an operating system in a pre-boot environment of the programmable apparatus;
identify an untrusted component of the operating system registered to be automatically loaded or loaded during a boot-up stage of the operating system that is predetermined to be early; and
determine, in the pre-boot environment, whether to allow the operating system to load, based on characteristics of the untrusted component.

11. The programmable apparatus of claim 10, wherein the programmable apparatus is a mobile device.

12. The programmable apparatus of claim 10, wherein the programmable apparatus is an embedded programmable device.

13. The programmable apparatus of claim 10, wherein the instructions that when executed cause at least some of the one or more processors to determine, in the pre-boot environment, whether to allow the operating system to load, based on characteristics of the untrusted component comprise instructions that when executed cause at least some of the one or more processors to:
reschedule a load order of the untrusted component.

14. The programmable apparatus of claim 10, wherein the instructions that when executed cause at least some of the one or more processors to determine, in the pre-boot environment, whether to allow the operating system to load, based on characteristics of the untrusted component comprise instructions that when executed cause at least some of the one or more processors to:
substitute a trusted component for the untrusted component.

15. The programmable apparatus of claim 10, wherein the instructions that when executed cause at least some of the one or more processors to determine, in the pre-boot environment, whether to allow the operating system to load, based on characteristics of the untrusted component comprise instructions that when executed cause at least some of the one or more processors to:
load the operating system without the untrusted component.

16. The programmable apparatus of claim 10, wherein the instruction that when executed cause at least some of the one or more processors to determine, in the pre-boot environment, whether to allow the operating system to load, based on characteristics of the untrusted component comprise instructions that when executed cause at least some of the one or more processors to:
abort loading the operating system if the untrusted component is a critical non-substitutable component.

17. The programmable apparatus of claim 10, wherein the instructions that are stored in the memory further comprise instructions that when executed cause the at least some of the one or more processors to:
monitor a security system of the programmable apparatus during execution of the operating system, to ensure that the security system executes as expected.

18. The programmable apparatus of claim 10, wherein the one or more processors and memory are virtualized.

19. A method of controlling loading of an operating system, comprising:
analyzing an image of an operating system in a pre-boot environment of a programmable device;
identifying an untrusted component of the operating system configured to be automatically loaded or loaded during a boot-up stage of the operating system that is predetermined to be early; and determining, in the pre-boot environment, whether to load the operating system, based on characteristics of the untrusted component.

20. The method of claim 19, further comprising:

determining whether the untrusted component is a non-substitutable component; and aborting loading the operating system in the programmable device if the untrusted component is a critical non-substitutable component.

* * * * *